PINDAR F. COOLEY.
Improvement in Whip-Hangers.
No. 4,520. Reissued Aug. 22, 1871.
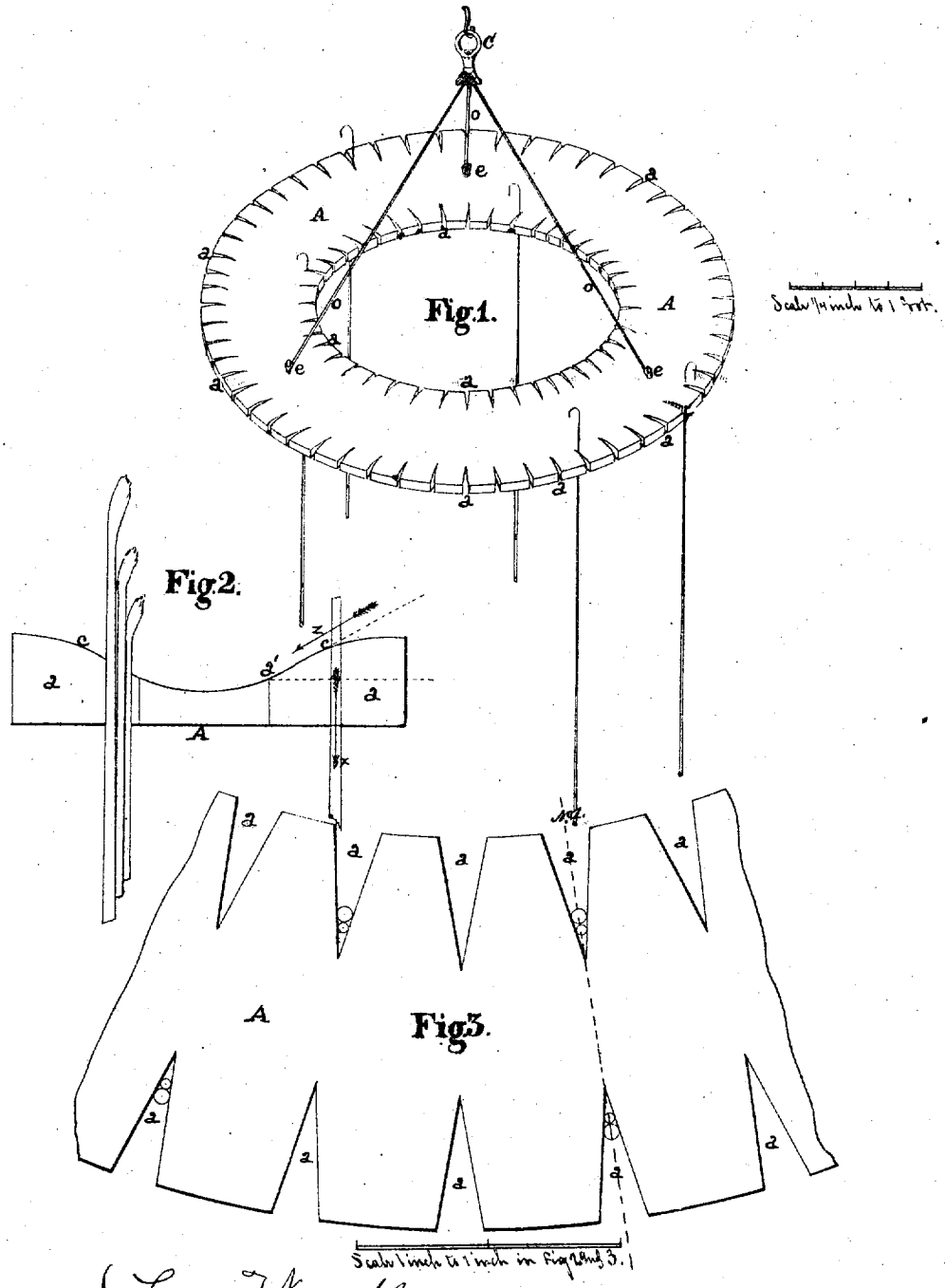
Witnesses. { Lewis J. Newell, Chas. Selkirk
Pindar F. Cooley by his Attorney Alex. Selkirk Inventor.
AM. PHOTO-LITHOGRAPHIC CO. N.Y. (OSBORNE'S PROCESS.)

UNITED STATES PATENT OFFICE.

PINDAR F. COOLEY, OF PITTSFIELD, MASSACHUSETTS.

IMPROVEMENT IN WHIP-HANGERS.

Specification forming part of Letters Patent No. 81,754, dated September 1, 1868; reissue No. 4,520, dated August 22, 1871.

*To all whom it may concern:*

Be it known that I, PINDAR F. COOLEY, of the town of Pittsfield, in the State of Massachusetts, have invented a new and Improved Device for Hanging, Holding, and Preserving Whips; and I do hereby declare that the following is a description thereof, reference being had to the accompanying drawing forming a part of this specification, in which—

Figure 1 represents a perspective view of the invention. Fig. 2 is a cross-section through the rim taken at line No. 1 in Fig. 3, illustrating the mode of inserting and holding the whips. Fig. 3 is a vertical view of a section of the same with whips inserted.

My invention relates to the arrangement of curviform or sloping V-shaped notches, made in a suitable rim of wood or metal, having a circular, oval, square, or other form, as may be desired, which notches, by their particular upper surface-line, tend to facilitate the drawing of the snappers of the whips inward toward the point of the said notch when the whips are drawn vertically down, and will act equally the same to aid to throw the said snappers outward from the point of the notch when the whips are raised vertically up; and it further relates to the combination of the notched rim, with supporting-rods or chains and swivel, by which the whole apparatus can be suspended high over head, in such a manner that the longest whips held by their snappers can be suspended vertically clear of the floor and be revolved with the rim in such a manner that the whips can be turned out to the front or to the rear, as may be desired.

To enable others skilled in the art to make and use my invention, I will proceed to describe it in reference to the drawing and the letters of reference marked thereon, the same letters indicating like parts.

In the drawing, A represents the notch holding-rim, provided with the notches *a a*, which rim may be constructed of wood or metal, of any form and desired capacity as best adapted to its intended use, whether for whip-dealer's, livery, or private-stable use. The said rim can be provided with one or two ranges of the said notches, as desired, preference being given to two ranges of notches where a large number of whips are to be suspended. The said notches *a a* are made V-shaped or of an acute-angle form, as shown in Fig. 3, so as to be capable of receiving several whips at varying diameters in the same notch, as shown in Figs. 2 and 3. The upper surface-line *c* of the said notches is made sloping or down-curving, so that its lowest or more depressed portion will be at the point *a'* or apex of the notch, as shown in Fig. 2. The said sloping or down-curving surface-line *c*, acting with the acute angle of the notch, facilitates and aids the operator to suspend the whip by its snapper in a ready and sure manner when the apparatus is far beyond his reach, and it is only required by the operator, grasping the handle of the whip, to guide the snapper of the whip into the notch until it touches the sides of the same, when he will let the whip drop in direction of arrow *x* in Fig. 2, when the sloping or down-curving surface-line *c* will cause the whip to draw toward the point *a'* of the notch in a line of direction indicated by arrow *z*, and the lower the whip drops the closer will the snapper be drawn toward the said point and the tighter it will be held. A reverse operation by the operator will remove the whip from the notch. At suitable points on the upper side of the rim are placed the eyes *e e e*, to which are attached the supporting-rods *o o o*, or their equivalent chains or cords, which rods or chains connect in one common swivel, C, provided with an ordinary eye or link, by which the whole may be suspended from overhead from any suitable hook placed in the ceiling, or from a crane starting out from the wall or from a post. By the arrangement of the rim A and supporting-rods with the swivel C, the said rim is rendered capable of being revolved in either direction, and, when the apparatus is suspended in a corner or contracted space and loaded with whips, the whips facing the corner and remote from reach, can be readily turned out from such corner and be brought within reach by simply revolving the apparatus by its swivel.

By my invention a number of whips can be suspended in a small space and the whips so suspended will be held above the floor and within reach from their snapper ends, and can be readily taken out or replaced by the operator as he stands on the floor.

Having described my invention, what I claim, and desire to secure by Letters Patent, is—

1. The arrangement of the sloping or down-curving upper surface-line *c* with the V-shaped notch *a*, whereby the said notch is rendered capable of readily drawing the snapper of the whip toward the lowest point *a'* of the said notch when the whip is drawn down, and discharging the same from the notch when the whip is thrown up, substantially in the manner set forth.

2. The arrangement of the notched rim A, constructed as described, and the supporting-rods *o o o* with the swivel C, whereby the said notched rim will be rendered capable of being revolved, substantially as and for the purpose set forth.

PINDAR F. COOLEY.

Witnesses:
ALEX. SELKIRK,
JAMES C. KEENHOLTS.